United States Patent [19]
Fujita

[11] Patent Number: 5,995,507
[45] Date of Patent: Nov. 30, 1999

[54] ATM CELL MULTIPLEXING APPARATUS

[75] Inventor: Yoshitaka Fujita, Tokyo, Japan

[73] Assignee: NEC Corporation, Tokyo, Japan

[21] Appl. No.: 08/734,017

[22] Filed: Oct. 18, 1996

[30] Foreign Application Priority Data

Oct. 18, 1995 [JP] Japan .................................. 7-268911

[51] Int. Cl.⁶ .............................................. H04J 3/04
[52] U.S. Cl. .......................................... 370/395; 370/541
[58] Field of Search ................................. 370/537, 538, 370/539, 540, 541, 395, 398, 535

[56] References Cited

U.S. PATENT DOCUMENTS

| | | | |
|---|---|---|---|
| 4,727,541 | 2/1988 | Mori et al. | 370/535 |
| 4,754,456 | 6/1988 | Yato et al. | 370/541 |
| 5,136,587 | 8/1992 | Obana et al. | 370/535 |
| 5,323,399 | 6/1994 | Kurano | 370/398 |
| 5,479,398 | 12/1995 | Cyr | 370/537 |
| 5,499,263 | 3/1996 | Schmitt et al. | 370/537 |
| 5,570,368 | 10/1996 | Murakami et al. | 370/395 |

FOREIGN PATENT DOCUMENTS 4-40718  2/1992  Japan .

*Primary Examiner*—Alpus H. Hsu
*Attorney, Agent, or Firm*—Sughrue, Mion, Zinn, Macpeak & Seas, PLLC

[57] ABSTRACT

An ATM cell multiplexing apparatus includes a plurality of first cell multiplexing units and a second cell multiplexing unit. The first cell multiplexing units divide a plurality of input cell streams into a plurality of groups, thereby multiplexing the input cell streams in units of groups. The second cell multiplexing unit further multiplexes multiplexed cell streams output from the first cell multiplexing units and outputs one multiplexed cell stream.

10 Claims, 13 Drawing Sheets

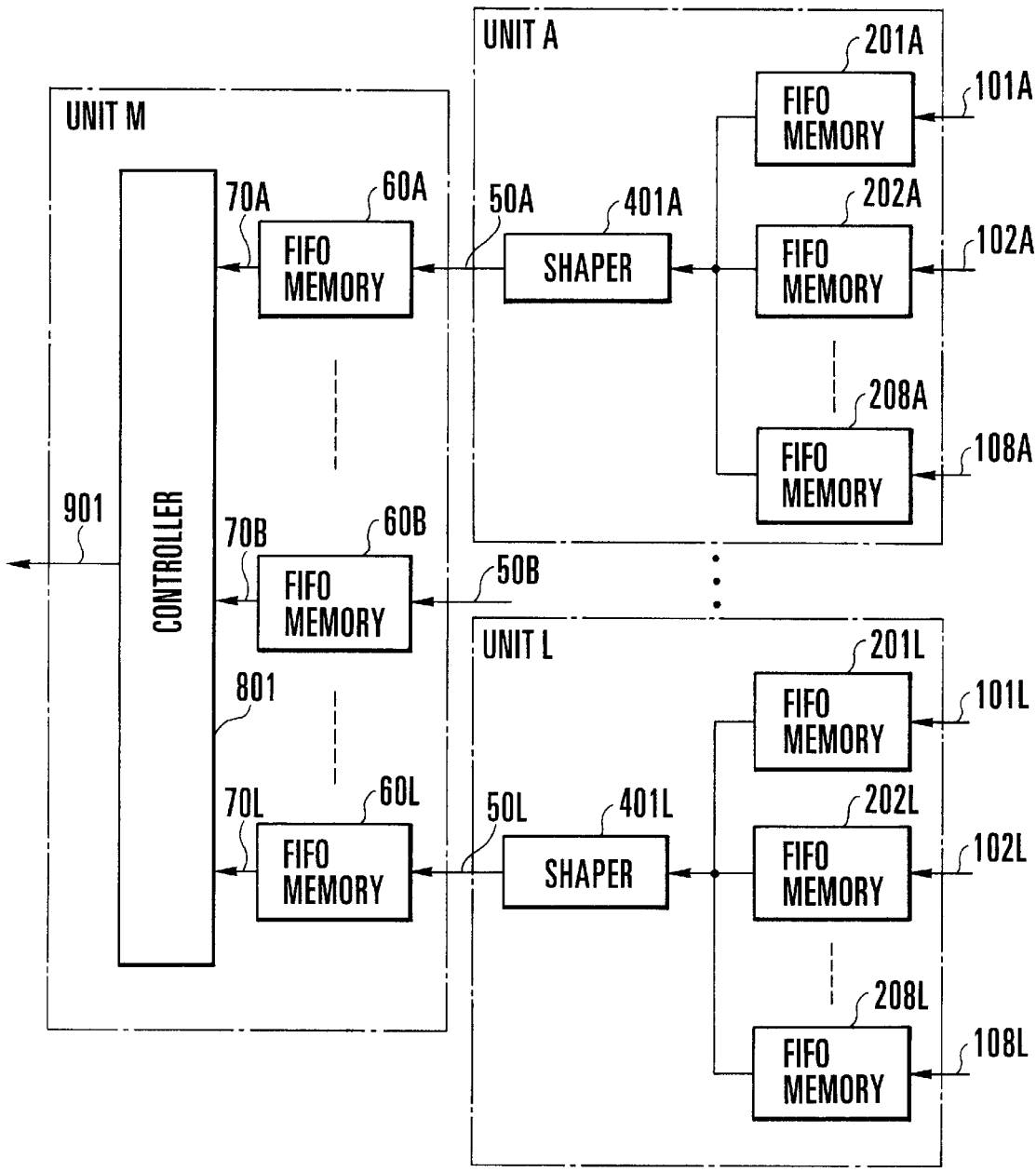
F I G. 1

FIG. 6A CLK 0001

FIG. 6B COUNTER 1001: 53 1 2 3 4 5 6 7 8 9 10 11 12 13 ... 52 53 1 2

FIG. 6C SIGNAL 2006

FIG. 6D SIGNAL 2008

FIG. 6E COUNTER 1002: STOP AT VALUE 1 (CAA IS SELECTED) | VALUE 2 (CAB IS SELECTED) | VALUE 3 | VALUE 4

FIG. 6F SIGNAL CAA: HOLD ACTIVE "High"

FIG. 6G SIGNAL 2001

FIG. 6H SIGNAL 2009

FIG. 6I DECORDER: HOLD ENA KEPT ACTIVE

ATM CELL MULTIPLEXING APPARATUS

BACKGROUND OF THE INVENTION

The present invention relates to an ATM (Asynchronous Transfer Mode) cell multiplexing apparatus and, more particularly, to an ATM cell multiplexing apparatus which multiplexes a plurality of cell streams for transferring cells each having a predetermined length in an ATM communication system.

Such an ATM cell multiplexing apparatus is disclosed in, e.g., Japanese Patent Laid-Open No. 4-40718. The cell multiplexing method of this apparatus is as follows. As shown in FIG. 11, data in input signals 11-1, 11-2, . . . , 11-n each having a cell stream are written in FIFO (First-In First-Out) memories 12-1, 12-2, . . . , 12-n serving as cell generators, respectively, in units of bytes. The data are accumulated in the FIFO memories 12-1, 12-2, . . . , 12-n to constitute cells, respectively. When read access in units of cells is enabled, cell send request signals 13-1, 13-2, . . . , 13-n are output from the FIFO memories 12-1, 12-2, . . . , 12-n to a cell send arbiter 15.

The cell send arbiter 15 processes the cell send request (RDY) signals 13-1, 13-2, . . . , 13-n and issues a cell send permission signal to one FIFO memory (12-n). Accumulated cell information is read out from the FIFO memory applied with the right therefor.

With this operation, cell data from the FIFO memories 12-1, 12-2, . . . , 12-n are sent as cell send permission (OE) signals 16A to 16D. These signals are byte-multiplexed by a byte multiplexing parallel/serial converter 17 so that a serial signal 18 is sent. A timing signal generator 19 generates a transfer clock 20 and cell send start timing signals A to D.

The cell send arbiter 15 will be described below with reference to FIGS. 12 and 13. FIG. 12 shows an example of a circuit 60 constituting the cell send arbiter shown in FIG. 11. FIG. 13 shows an example of a selector shown in FIG. 12. Assume that a memory 74 of a selector 60-3 (n=3) is at high level, and an ENo signal 62-3 is at high level.

In this state, when the RDY signals 13-1, 13-2, . . . , 13-n are not input to all selectors 60-1, 60-2, . . . , 60-n, AND circuits 71 and OR circuits 72 of all the selectors except for the selector 60-3 output signals at high level, and data send right output (ENo) signals are also at high level. This state will be referred to as a cell send right transfer state.

At this time, when the RDY signal 13-8 at high level is input to one of the selectors including the selector 60-3 in the cell send right transfer state, e.g., the selector 60-8 (n=8), the AND circuit 71 and OR circuit 72 of the selector 60-8 output signals at low level, and an ENo signal 62-8 goes low. This state will be referred to as a cell send right acquisition state.

All the selectors on the downstream side of the selector 60-8 in the cell send right acquisition state are set in a waiting state. Assume that, when the selector 60-8 is in the cell send right acquisition state, one of the selectors in the cell send right transfer state between the selector 60-3 and the selector 60-8 in the cell send right issue state, e.g., the selector 60-5 (n=5) receives the RDY signal 13-5 at high level. At this time, the selector 60-5 is immediately set in the cell send right acquisition state, and all the selectors on the downstream side of the selector 60-5 are set in the waiting state.

Therefore, the selector 60-8 loses the cell send right. More specifically, selectors closer to the selector 60-3 in the cell send right issue state are applied with a higher priority.

The first problem is that, in the prior art, as shown in FIG. 11, as the number of input ports 11-n (n is an integer) increases, the number of circuits 60 in the cell send arbiter 15 for cell send arbitration increases. The reason for this is that since read control for the FIFO memories 12-n to each input port 11-n is individually performed by independent circuits, another identical control circuit is necessary for a new input port.

The second problem is as follows. The above-described cell send arbiter 15 has a daisy chain configuration (in which circuit networks are connected in series with each other to form a chain-like configuration), as shown in FIG. 12. For this reason, a data send right is always imparted to only upper input ports (ports whose n is small). If cells frequently arrive at the upper input ports, and simultaneously, at lower input ports, the FIFO memories overflow with the cells unless the capacities of the FIFO memories of these input ports are largely increased. This is because the cell send arbiter has a series-connected chain-like configuration.

SUMMARY OF THE INVENTION

It is an object of the present invention to provide an ATM cell multiplexing apparatus which efficiently performs cell multiplexing with a simple arrangement when there are a large number of input ports for receiving cell streams.

In order to achieve the above object, according to the present invention, there is provided an ATM cell multiplexing apparatus comprising a plurality of first cell multiplexing means for dividing a plurality of input cell streams into a plurality of groups, thereby multiplexing the input cell streams in units of groups, and second cell multiplexing means for further multiplexing multiplexed cell streams output from the first cell multiplexing means and outputting one multiplexed cell stream.

BRIEF DESCRIPTION OF THE DRAWINGS

FIG. 1 is a block diagram showing an ATM cell multiplexing apparatus according to the first embodiment of the present invention;

FIGS. 6A to 6I are timing charts showing the operations of the respective sections of the controller shown in FIG. 5;

DESCRIPTION OF THE PREFERRED EMBODIMENTS

The present invention will be described below with reference to the accompanying drawings. FIG. 1 schematically shows an ATM cell multiplexing apparatus according to the first embodiment of the present invention. The ATM cell multiplexing apparatus shown in FIG. 1 performs cell multiplexing by performing ATM cell interleaving to convert a plurality of input signals each carrying an ATM cell stream into an output signal carrying one ATM cell stream. It is assumed that the length of one cell is 53 bytes, and a total of 12 first-stage units A to L are arranged.

Eight ATM cell streams 101A to 108A whose cell arrival times are not synchronized are input to the unit A in units of channels and temporarily stored in corresponding FIFO memories 201A to 208A, respectively.

Traffic shaping is performed by a shaper 401A such that the ATM cell streams 101A to 108A input in units of channels are separated at an equal interval, and the ATM cell streams 101A to 108A are output as a signal 50A multiplexed by the unit A. In the remaining units B to L as well, eight ATM cell streams are multiplexed and output as signals 50B to 50L, respectively.

Figure 2:
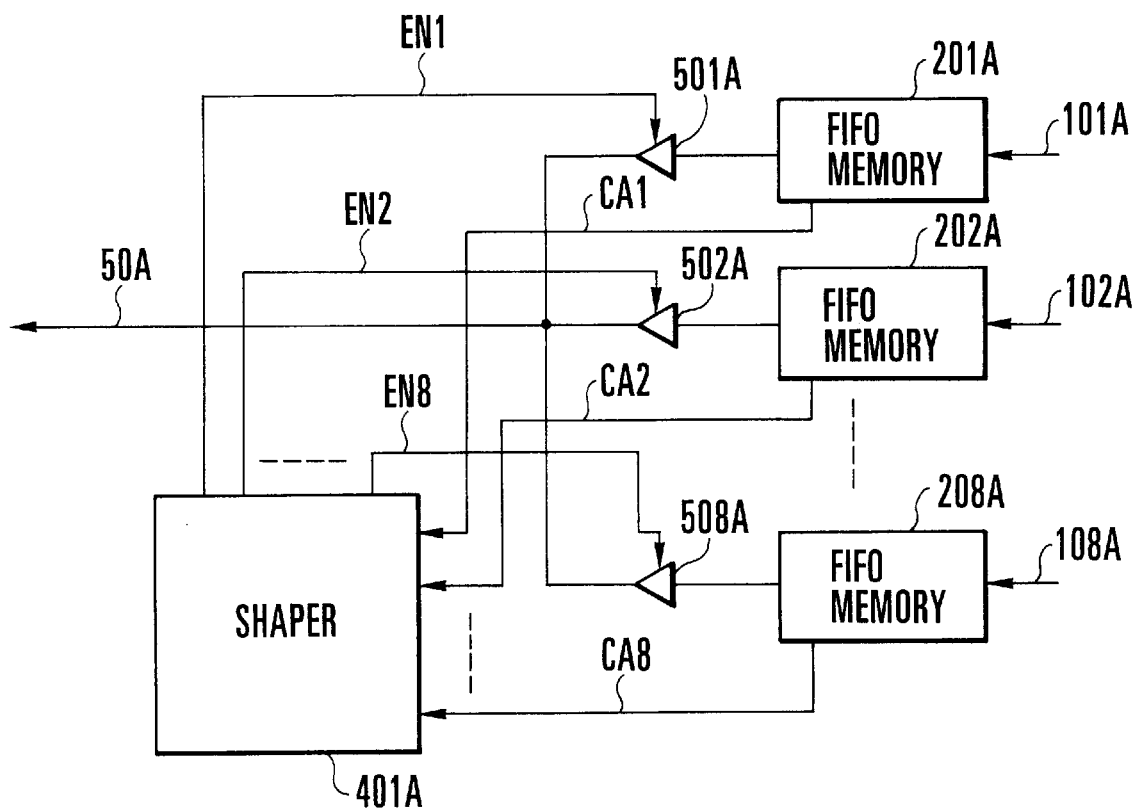
FIG. 2 is a block diagram showing an example of a first-stage unit shown in FIG. 1.

The unit A will be described below in more detail with reference to FIG. 2. The remaining units B to L have the same arrangement as that of the unit A. For example, the ATM cell stream 101A which is input at a certain rate is temporarily stored in the FIFO memory 201A, excluding idle cells. The capacity of this FIFO memory corresponds to at least one cell.

For the FIFO memories 201A to 208A, the shaper 401A sequentially checks cell available signals CA1, CA2, . . . , CA8 each representing that at least one cell is stored in the memory. If one of these signals is active, an enable signal ENM (M is an integer satisfying $1 \leq M \leq 8$) to a tristate buffer 50NA provided to the output of a FIFO memory 20NA (N is an integer satisfying $1 \leq N \leq 8$) goes active at that point of time, and outputs from the remaining FIFO memories are set at high impedance, thereby reading out data of one cell. In this case, if the cell available signal CA1 from the FIFO memory 201A is active, an enable signal EN1 goes active, and data of one cell is read out from the FIFO memory 201A.

This operation will be described below in more detail with reference to FIG. 3. When data of one cell is to be read out from the FIFO memory 201A, the data is read out at a rate of 51.84 Mb/s. A time assigned to each FIFO memory corresponds to three cells such that two idle cells S2 and S3 are arranged to sandwich a valid cell S1 (each cell is octet-multiplexed/demultiplexed and therefore read out in units of bytes, and the read rate for each channel is 6.48 Mb/s).

Figure 3:
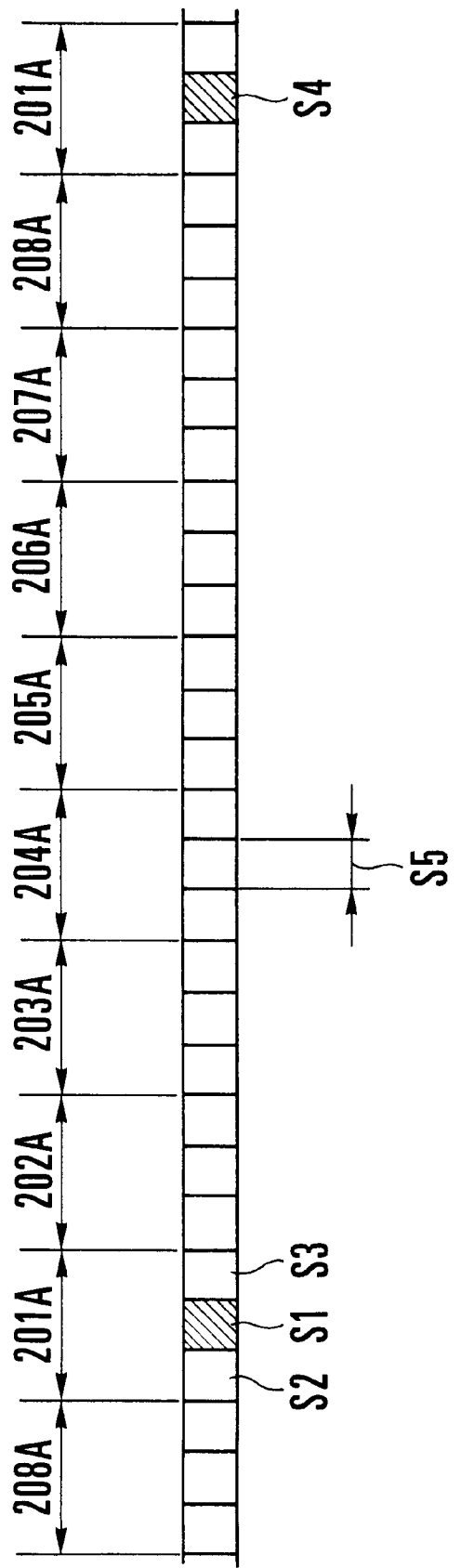
FIG. 3 is a view showing an output format obtained upon ATM multiplexing by the first-stage unit shown in FIG. 1.

In FIG. 3, S5 indicates a position where a valid cell is read out from the FIFO memory 204A. This also applies when a cell is read out from one of the FIFO memories 202A to 208A. A time corresponding to 23 cells elapses until a valid cell S4 is read out from the FIFO memory 201A again. The throughput of reading out a cell from the FIFO memory of one channel is 2.16 Mb/s (=51.84 Mb/s÷(8×3)).

As described above, the respective channel inputs 101A to 108A are subjected to traffic shaping and ATM cell multiplexing and output from the unit A as the signal 50A.

In the remaining units B to L as well, ATM cell streams are subjected to ATM cell multiplexing by the same technique and output as the signals 50B to 50L.

Figure 4:
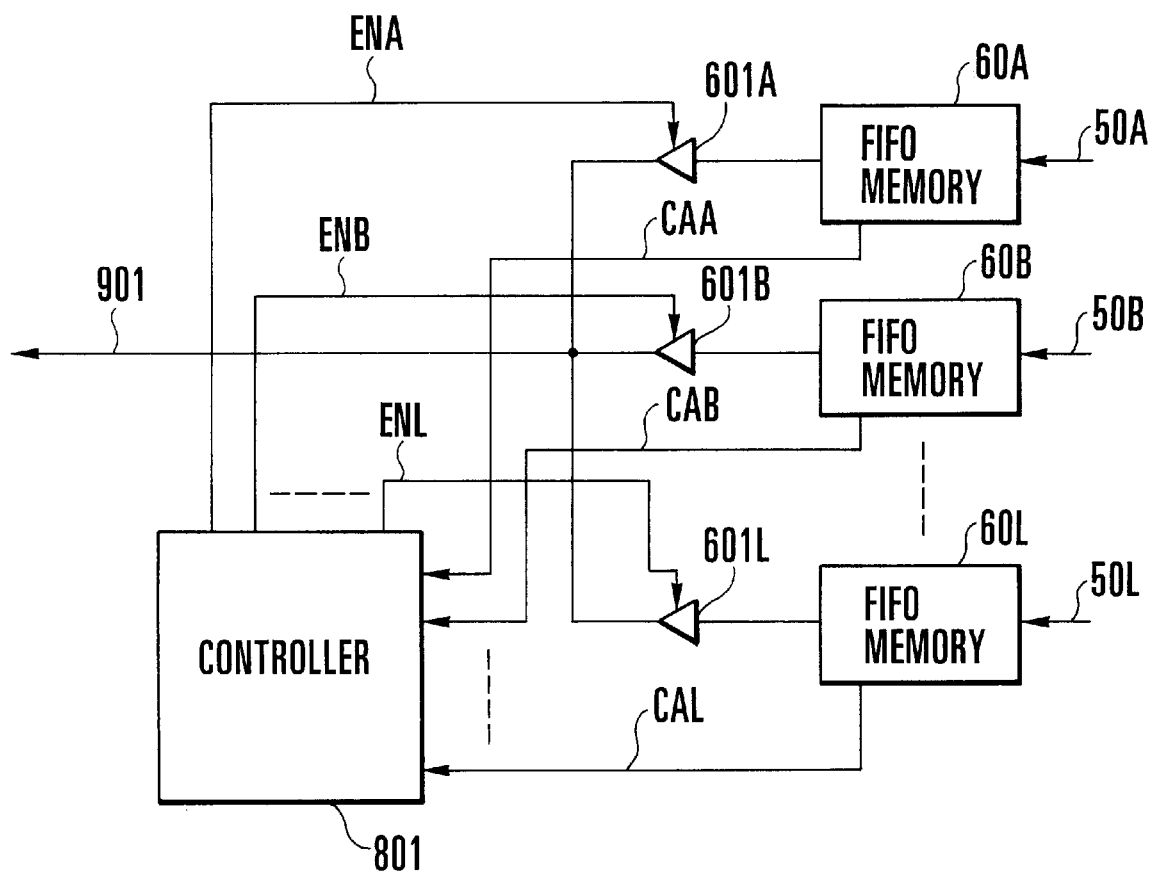
FIG. 4 is a view showing an example of a second-stage unit shown in FIG. 1.

The ATM cell multiplexing method of a second-stage unit M will be described below with reference to FIG. 4. The signals 50A to 50L obtained upon cell multiplexing by the units A to L are input to the unit M and written in corresponding FIFO memories 60A to 60L, respectively.

For the FIFO memories 60A to 60L, a controller 801 sequentially checks cell available signals CAA to CAL each representing that at least one cell is stored in the memory, as in the operation of the unit A. If one of these signals is active, the enable signal ENM (M is one of A to L) to a tristate buffer 601N provided to the output of a FIFO memory 60N (N is one of A to L) goes active at that point of time, and outputs from the remaining FIFO memories are set at high impedance, thereby reading out data of one cell.

For example, while a cell (53 bytes) is read out from the FIFO memory 60A, the cell available signals CAN, i.e., CAA to CAL from the adjacent FIFO memories 60B, 60C, . . . , 60L are sequentially checked. The retrieval counter is stopped at a position where the signal is active. At the next cell read timing, a cell is read out from the FIFO memory 60N designated by the counter.

A controller for receiving the cell available signal CAN and outputting the enable signal ENM as a read command to the FIFO memory will be described below with reference to FIGS. 5 and 6.

Figure 5:
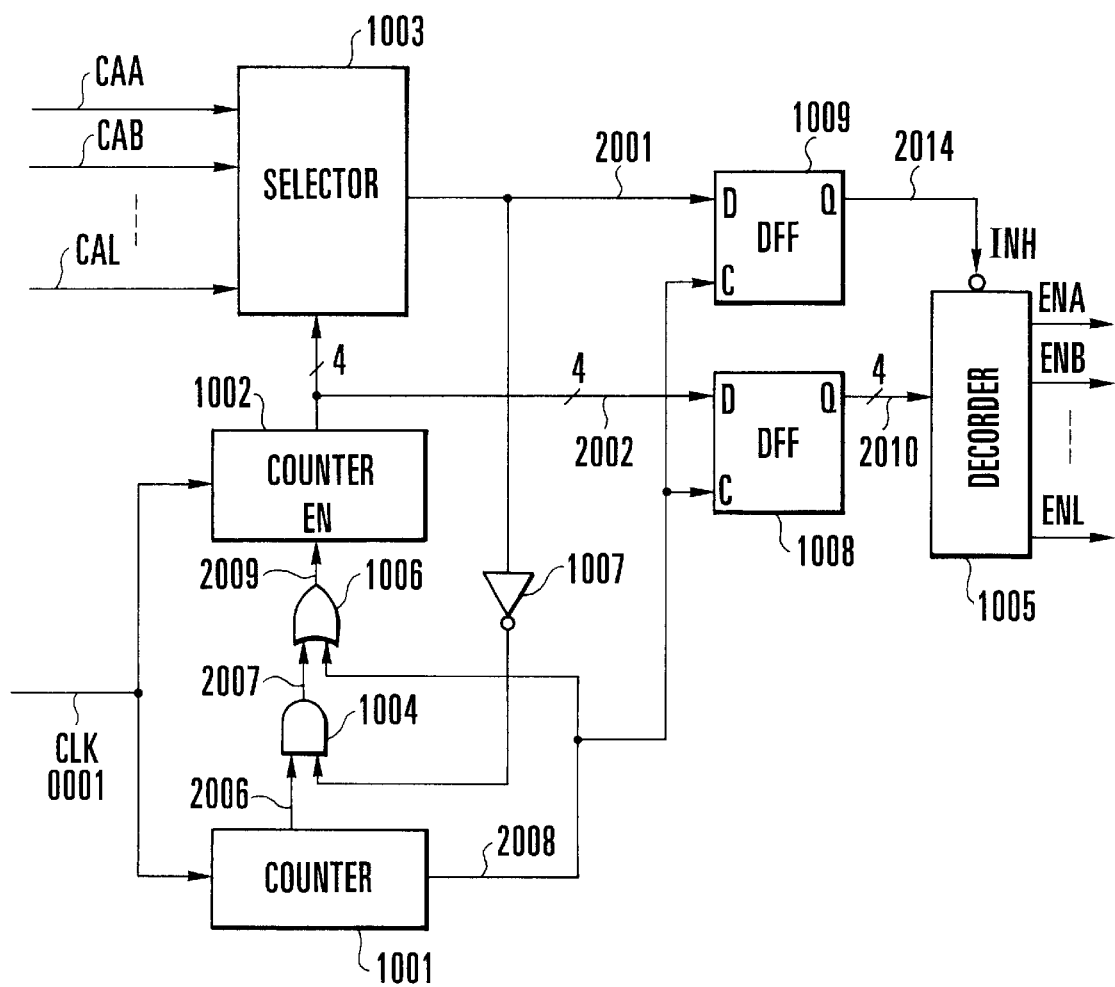
FIG. 5 is a block diagram showing an example of a controller shown in FIG. 4.

Referring to FIG. 5, a counter 1001 is a 53-frequency-dividing counter which frequency-divides a clock (CLK) 0001, thereby generating a pulse 2006 corresponding to one cell period. A counter 1002 is a 12-frequency-dividing counter. A selector 1003 outputs the cell available signal CAN, i.e., any one of the cell available signals CAA to CAL corresponding to the value of a 4-bit control signal 2002 from the counter 1002, as a signal 2001. A decoder 1005 decodes a coded signal of a 4-bit output 2010 from a D-type flip-flop (DFF) 1008, which is obtained by latching the 4-bit control signal 2002 from the counter 1002 and outputs enable signals ENA, ENB, . . . , ENL.

The operation of the controller having the above arrangement will be described below.

The counter 1001 counts the CLK 0001 from 1 to 53, thereby frequency-dividing the clock into 53 portions. At this time, the counter 1001 outputs the signal 2006 (active "H") at count values "1" to "12" and a signal 2008 (active "H") at a count value "12". The signal 2006 enables the counter 1002 through an AND gate 1004 and an OR gate 1006 when the signal 2001 is at "L". The enabled counter 1002 counts the CLKs 0001 to retrieve the cell available signal CAN at active "H". On the other hand, the signal 2008 enables the counter 1002 through an OR gate 2009 only once at the cell period, and at the same time, is output to the DFFs 1008 and 1009 to determine the cell read timing.

In such a basic sequence, when the cell available signal CAN goes "H", and the signal 2001 is at "L", an output from an inverter 1007 goes "H" and is input to the AND gate 1004. With this operation, the signal 2006 at "H" from the counter 1001 passes through the AND gate 1004 and the OR gate 2009 to enable the counter 1002. The enabled counter 1002 counts up until the signal 2001 goes "H", thereby controlling the selecting operation of the cell available signal CAN by the selector 1003. At this time, the coded 4-bit output 2002 is output to the selector 1003 as a control (selection) signal. On the other hand, when the cell available signal CAN goes "H", and the signal 2001 is at "H", i.e., when another cell available signal is in a selected state, the output from the inverter 1007 goes "L" and is input to the AND gate 1004. With this operation, the signal 2006 from the counter 1001 is inhibited by the AND gate 1004, so that the counter 1002 is enabled by the signal 2006 at the period next to processing of the signal 2001 and starts to count up to select the subsequent cell available signal CAN.

When the cell available signal CAN is selected, and the signal 2001 goes "H", the output from the inverter 1007 goes "L" to inhibit the signal 2006 by the AND gate 1004. For this reason, the signal 2006 goes "L" to disable the counter 1002 and stop the count operation. The counter 1002 which has stopped the count operation fixes the signal 2002 to be output to the selector 1003 and the DFF 1008. At this time, the signal 2002 represents that the cell available signal CAN is selected.

The signal 2002 fixed by the counter 1002 is read out at the next cell read timing so that an enable signal ENN is sent back to the FIFO 60N. More specifically, when the counter value of the counter 1001 is "12", the signal 2002 is latched to the DFF 1008 by the signal 2008, and the latch signal 2010 is decoded by the decoder 1005 and output as the enable signal ENN.

As described above, the controller sends back the enable signal ENN at the cell period corresponding to the count values "12" to "11" of the counter 1001 to designate to read out the cell data, retrieves the cell available signal CAN at active "H" in correspondence with the count values "1" to "12" while reading out the cell data to hold the selection signal, latches the held selection signal at the timing of the count value "12" (signal 2008), and decodes and outputs the selection signal as the enable signal ENN.

An enable signal send back operation performed when valid cells are continuously written only in the FIFO memory 60A will be described below with reference to FIGS. 6A to 6I. Assume that no idle cell is stored in the FIFO memories 60A to 60L. In response to the cell available signal CAA, the decoder 1005 holds the enable signal ENA at "H" (FIG. 6I). Since the cell available signal CAA at "H" is selected, the signal 2001 goes to "H" (FIG. 6G).

In this state, the signal 2001 at "H" is inverted by the inverter 1007 and input to the AND gate 1004. The AND gate 1004 calculates the AND of the inverted output from the inverter 1007 and the signal 2006 (FIG. 6C) which goes "H" when the count value (FIG. 6B) of the counter 1001 is "1" to "12" and outputs the signal 2007 at "L". With this operation, the signal 2009 output from the OR gate 1006 also goes "L" to disable the counter 1002 and stop the count operation of the CLK 0001 (FIG. 6A) (FIG. 6E). At this time, the signal 2002 from the counter 1002 is fixed while selecting the cell available signal CAA.

The signal 2002 is latched to the DFF 1008 at cell read timing T1 at the rise of the signal 2008 (FIG. 6D). The decoder 1005 decodes the latch signal 2010 of the DFF 1008 and continuously sends back the enable signal ENA at "H" to the FIFO memory 60A (FIG. 6I). Upon receiving the enable signal ENA, the FIFO memory 60A reads out the cell at the cell period corresponding to the count values "12" to "11" of the counter 1001.

When the signal 2002 is latched to the DFF 1008, the signal 2008 at "H" is simultaneously output to the counter 1002 through the OR gate 1006 as the signal 2009 (FIG. 6H). The counter 1002 is enabled by the signal 2009 and incremented by "1" (FIG. 6E). With this operation, the 4-bit code output 2002 is changed from the value "1" to the value "2" to designate the selector 1003 to select the cell available signal CAB. In this case, as described above, it is assumed that valid cells are input and written only in the FIFO memory 60A of the FIFO memories 60A to 60L. Therefore, the selector 1003 outputs the signal 2001 at "L" in correspondence with the cell available signal CAB (FIG. 6G). With this operation, an output from the inverter 1007 goes "H" and is input to the AND gate 1004.

Thereafter, when the count value of the counter 1001 becomes "1" to "12", and the signal 2006 goes active "H", the output 2007 from the AND gate 1004 goes "H", and the output 2009 from the OR gate 1006 also goes "H", thereby enabling the counter 1002. The enabled counter 1002 counts the CLK 0001 in synchronism with the count operation of the counter 1001 (FIG. 6E), so that the 4-bit code output 2002 is sequentially incremented by one until the signal 2001 goes "H". More specifically, the cell available signal CAN at active "H" is retrieved in correspondence with the count values "1" to "12". In this case, the counter 1002 is incremented until the selector 1003 selects the cell available signal CAA shown in FIG. 6F again. When the cell available signal CAA is selected, the signal 2001 goes "H" to stop the count operation of the counter 1002. When the counter 1001 takes the count value "12" at the next time, the signal 2002 from the counter 1002 is latched to the DFF 1008 by the signal 2008, so that the enable signal ENA at active "H" is output from the decoder 1005. With this operation, the cells in the FIFO memory 60A are continuously read out.

When no cells are read out from the FIFO memories 60A to 60L any more, the DFF 1008 holds an arbitrary value. The DFF 1009 holds the signal 2080 at "L" and outputs an inhibit signal (INH) 2014 to the decoder 1005. For this reason, all the outputs ENA to ENL from the decoder 1005 go "L" regardless of the value of the latch output 2010 from the DFF 1008, thereby preventing an erroneous operation.

To prevent the erroneous operations of the DFFs 1008 and 1009, the signal 2002 input to the DFF 1008 and the signal 2001 input to the DFF 1009 may be latched at a timing corresponding to a half clock.

The rate of reading cells from the FIFO memories 60A to 60L is 155.52 Mb/s. Since each cell is octet-multiplexed/demultiplexed and therefore read out in units of bytes, and the read rate is 19.44 Mb/s.

With the above procedures, the ATM cell streams 50A to 50L from the units A to L are multiplexed and output from the unit M at a throughput of 155.52 (Mb/s). The average throughput of reading the cell streams from the FIFO memories 60A to 60L is 12.96 Mb/s.

The block diagram in FIG. 5 showing the detailed example of the controller 108 and the operation timing charts shown in FIGS. 6A to 6I are only examples, and various changes and modifications can be made.

Figure 7:
FIG. 7 is a view showing a multiplexed cell stream at a rate of 155.52 Mb/s, which is multiplexed by the second-stage unit shown in FIG. 1.

The operation of the above-described ATM cell multiplexing apparatus will be described below. In this apparatus, an ATM cell stream signal is subjected to ATM cell multiplexing and output from the unit M at a rate of 155.52 Mb/s, as shown in FIG. 7.

Figure 8:
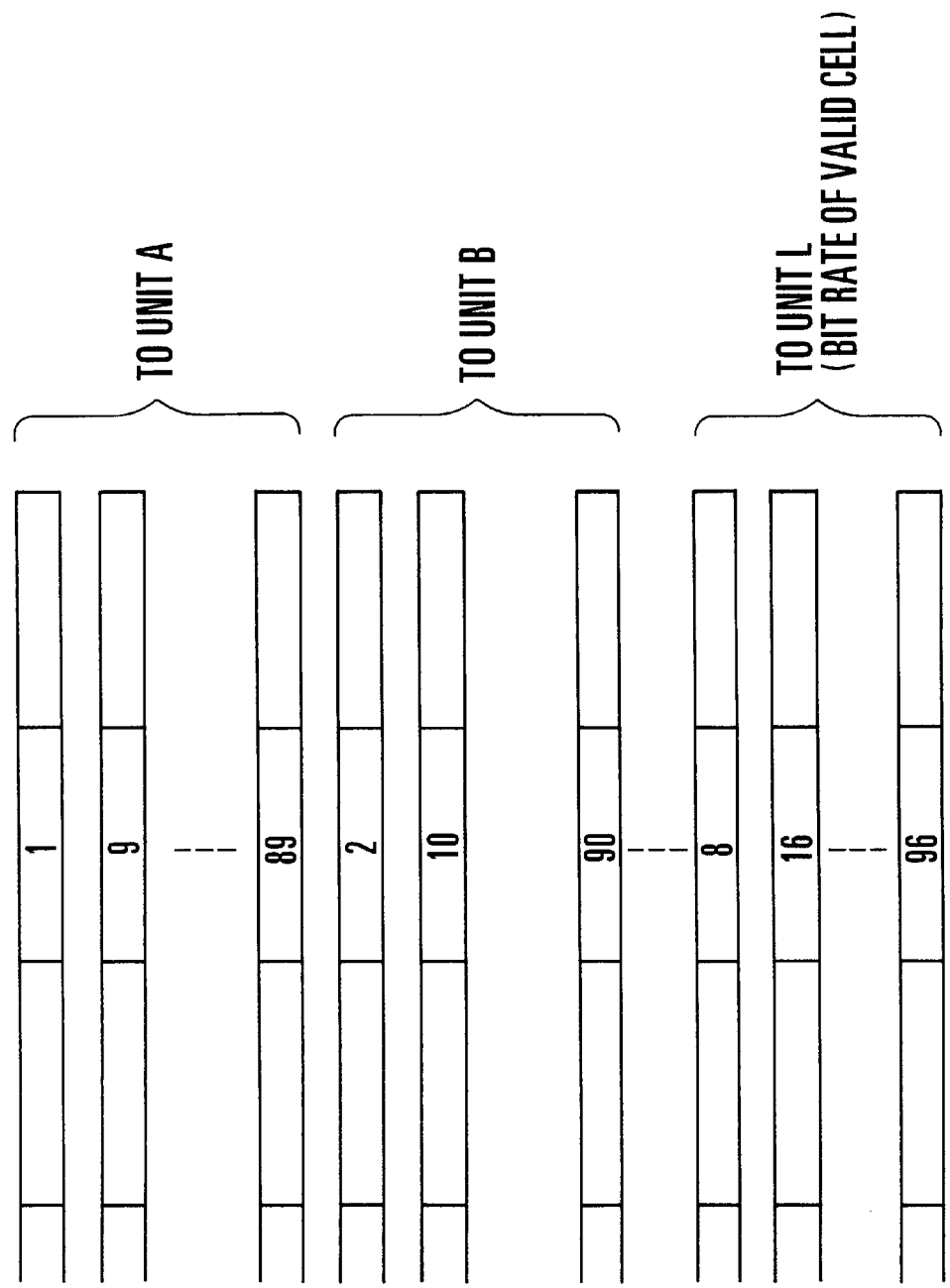
FIG. 8 is a view showing a cell stream input to the first-stage unit when the multiplexed cell stream shown in FIG. 7 is to be generated.

Assume that 96 (8×12) ATM cells are input to the cell multiplexing units A to L at the first stage, and the average bit rate of valid cells of the respective inputs is 1.62 Mb/s. In this case, inputs as shown in FIG. 8 can be considered. Cells applied with numbers are valid cells, and cells without any numbers are idle cells.

Figure 9:
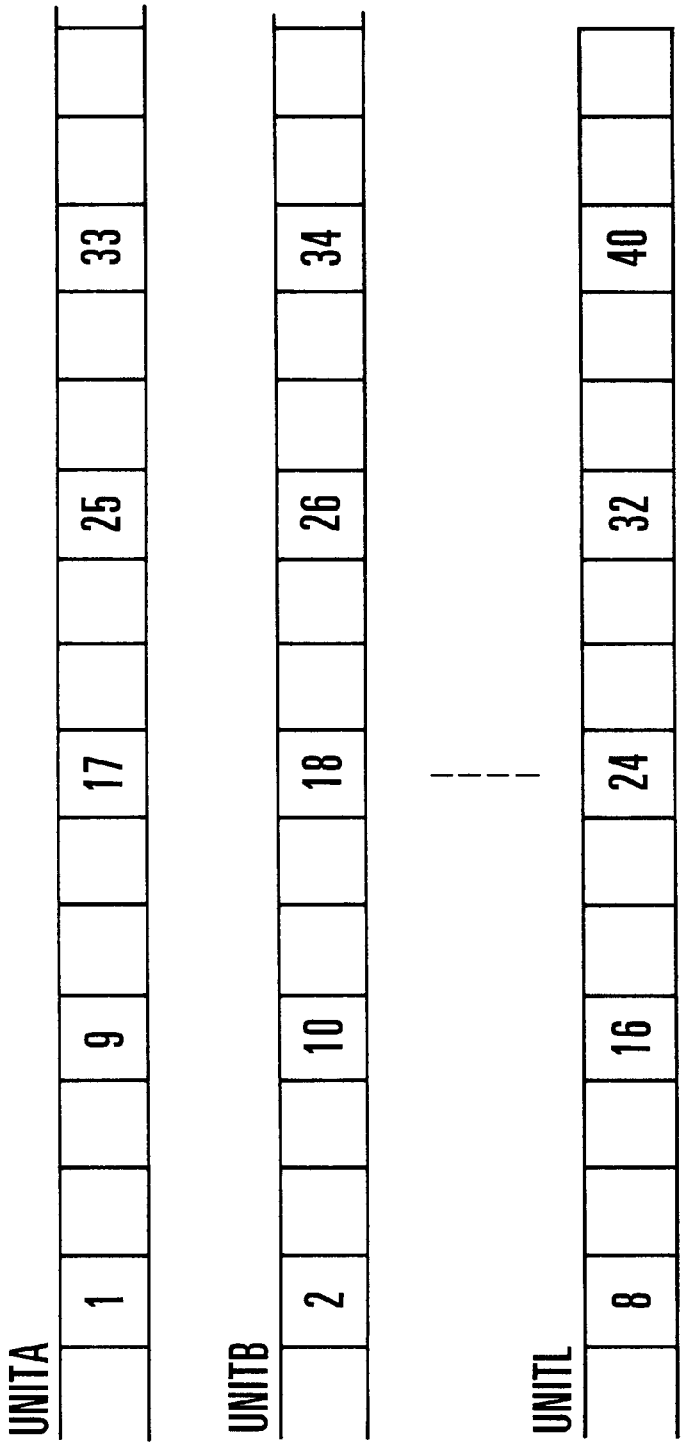
FIG. 9 is a view showing a multiplexed cell stream obtained when the cell stream shown in FIG. 8 is multiplexed by the first-stage unit.

FIG. 9 shows the cell streams after cell multiplexing by the units A to L of the first stage. The average bit rate of the valid cells is 12.96 Mb/s. A time corresponding to three cells is assigned to each channel. When these cell streams are multiplexed by the cell multiplexing unit M at the second stage, the cell stream shown in FIG. 7 is obtained.

In FIG. 9, the cell streams after cell multiplexing at the first stage are subjected to shaping in units of channels, and the average maximum rate is 2.16 Mb/s.

In cell multiplexing at the next stage, shaping is not performed in units of channels. The FIFO memories 60A to 60L shown in FIG. 1 are sequentially checked, and cells are read out with a priority only from FIFO memories in which valid cells are stored, so that the multiplexed cell stream having a cell rate of 155.52 Mb/s, as shown in FIG. 7, can be obtained.

The second embodiment of the present invention will be described below. In the first embodiment, a bandwidth (bit rate of valid cells) assigned to the input channels 101A, 102A, . . . , 107L, and 108L of ATM cell streams in FIG. 1 is 2.16 Mb/s. Since the input channels comprise a total of 96 ports, 96×2.16 Mb/s=207.36 Mb/s. Assume that cell streams are simultaneously input to the 96 ports at a valid cell rate of 2.16 Mb/s. In this case, in cell multiplexing units A to L at the first stage, a cell stream having a valid cell rate of 17.28 Mb/s is input to an ATM multiplexing unit M at the second stage, so that the rate of cell streams input to nine ports becomes 155.52 Mb/s (=9×17.28 Mb/s). Therefore, when cell streams are input to 12 ports at this valid cell rate, FIFO memories 60A to 60L in the cell multiplexing unit M at the second stage overflow.

To prevent such an overflow, the total of valid cell rates assigned to the respective input port channels of all the cell multiplexing units A to L at the first stage is managed to be 155.52 Mb/s. In addition, shaping functions at different rates are imparted to the units A to L. With this arrangement, cell multiplexing can be performed without any overflow of the FIFO memories 60A to 60L in the cell multiplexing unit M at the second stage. To impart shaping functions at different rates, the read rates (clock rates) of the units A to L may be made different.

Figure 10:
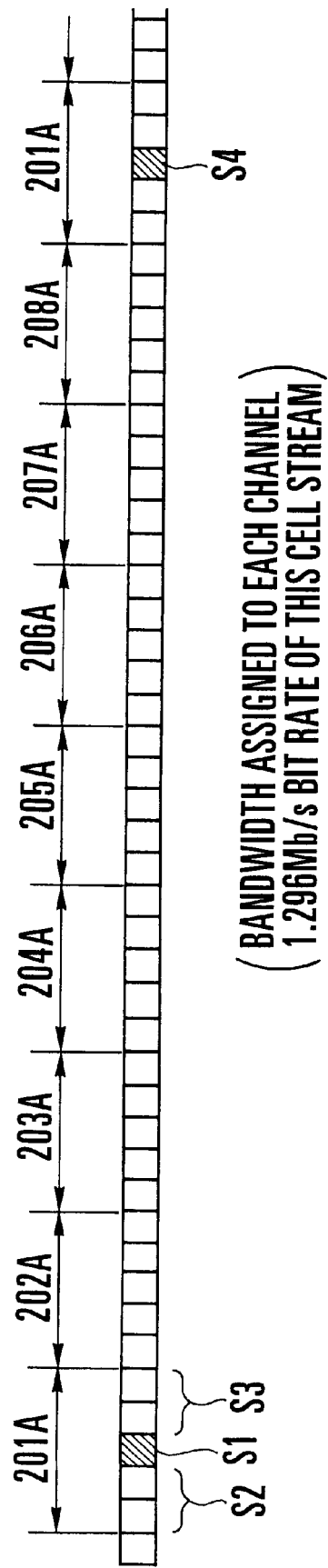
FIG. 10 is a view showing a multiplexed cell stream output from a second-stage unit so as to explain an ATM cell multiplexing apparatus according to the second embodiment of the present invention.
Figure 11:
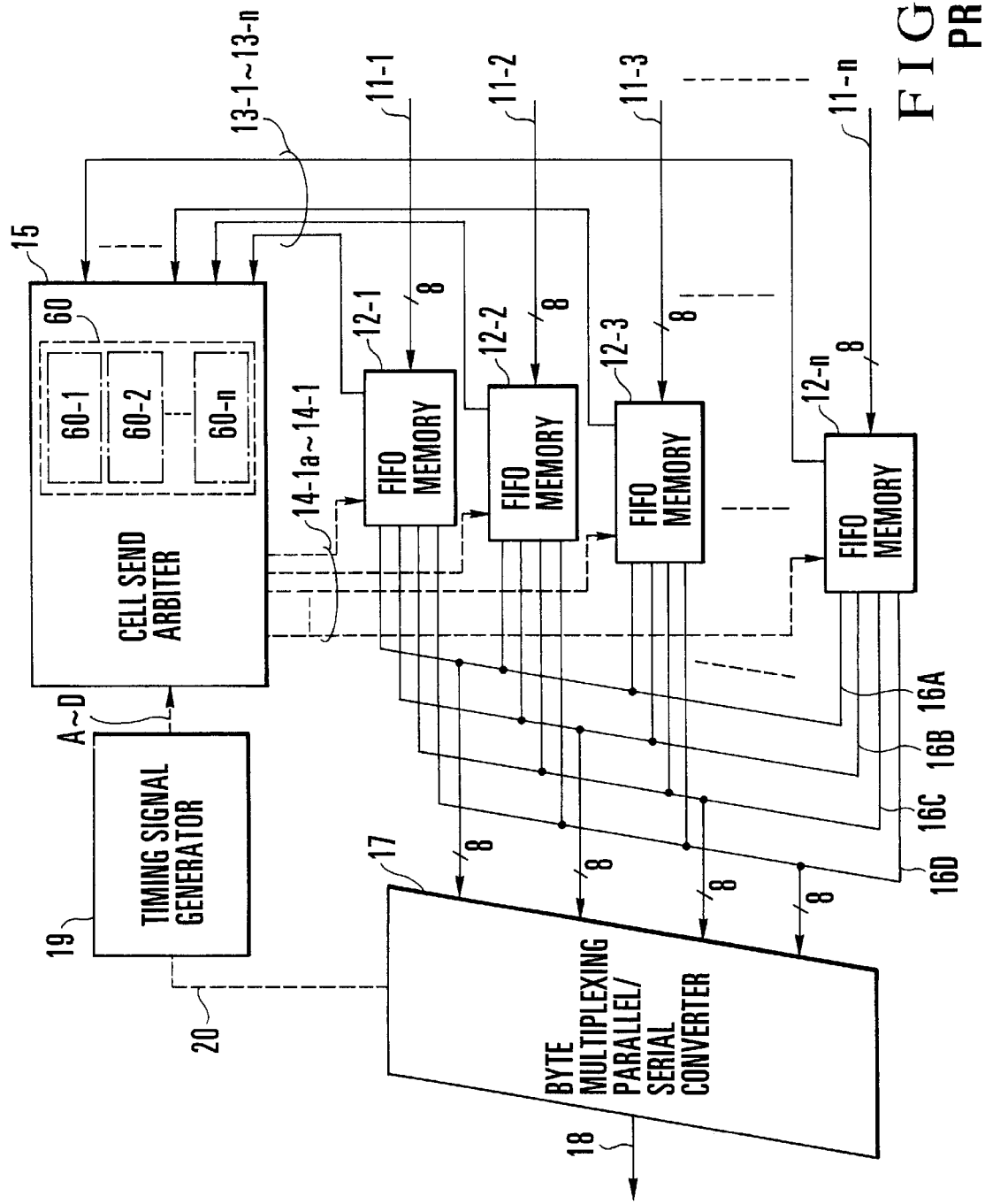
FIG. 11 is a block diagram showing a conventional ATM cell multiplexing apparatus.
Figure 12:
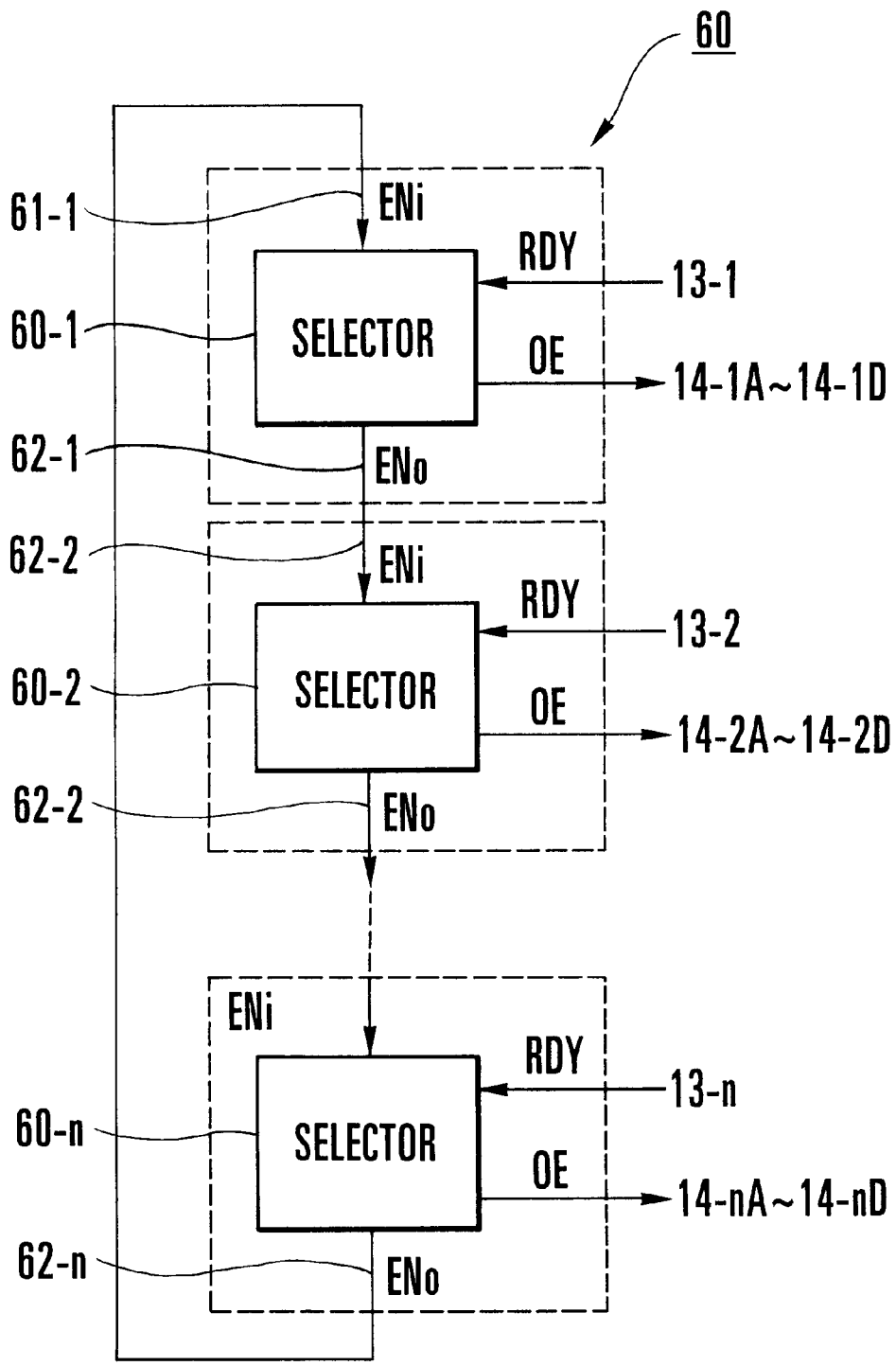
FIG. 12 is a block diagram showing an example of the main circuit of a cell send arbiter shown in FIG. 11.
Figure 13:
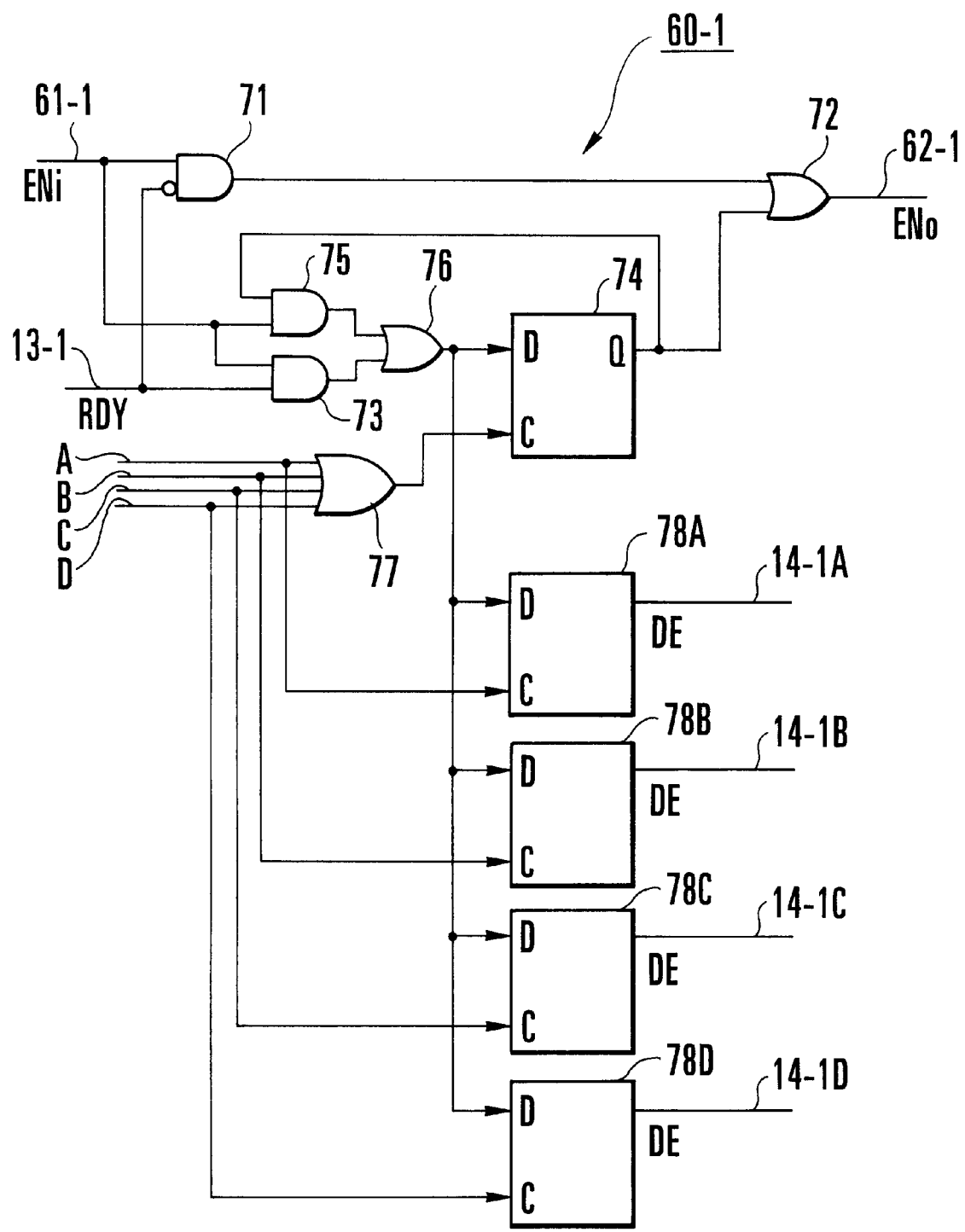
FIG. 13 is a block diagram showing an example of a selector shown in FIG. 12.

As such an example, FIG. 10 shows a signal output 901 multiplexed by the cell multiplexing units A to L at the first stage. In FIG. 10, a time corresponding to five cells is assigned to each input channel. The bit rate assigned to each channel is 1.296 Mb/s (=2.16 Mb/s×3/5), though it is 2.16 Mb/s in the first embodiment. S1 and S4 represent valid cells, and S2 and S3 represent idle cells.

As described above, shaping functions at different rates are imparted to the cell multiplexing units A to L at the first stage. In this case, even when the bit rates of valid cells of all the input channels simultaneously reach the peak rates assigned to the respective channels, the cell multiplexing unit M at the next stage does not overflow with cells, and the cell stream is output at a throughput of 155.52 Mb/s.

As described above, when the valid cell rate of each input channel is 2.16 Mb/s, and the total input ports are less than 96, e.g., 72, the cell rate becomes 155.52 Mb/s (=72×2.16 Mb/s). The ATM cell multiplexing unit M at the next stage does not overflow with cells. Therefore, by increasing/decreasing the ATM cell multiplexing units A to L at the first stage by using a building block form (in this case, nine units are arranged at the first stage), a compact system can be constituted.

As has been described above, according to the present invention, the processes of ATM cell multiplexing are performed over a plurality of stages. Even when the number of input ports increases/decreases, the circuit arrangement can be simplified, and the apparatus can be constituted using a building block form because the apparatus has a block configuration.

In addition, by imparting the traffic shaping function to the cell multiplexing units at the first stage, an ATM cell output from an input port as another input channel is not adversely affected.

Furthermore, the cell multiplexing circuit at the second stage accesses the next readable FIFO memory while reading out a cell from one FIFO memory, thereby reading out cells from the readable FIFO memory. With this arrangement, the throughput of an ATM cell stream to be finally output can be increased.

What is claimed is:

1. An ATM cell multiplexing apparatus comprising:

a plurality of first cell multiplexing means for dividing a plurality of input cell streams into a plurality of groups and multiplexing each of said plurality of groups to form a plurality of multiplexed cell streams; and second cell multiplexing means for further multiplexing said multiplexed cell streams and outputting one output multiplexed cell stream;

wherein each of said first cell multiplexing means comprises a plurality of memory means, arranged in correspondence with the input cell streams, for temporarily storing valid cells of the input cell streams, and read control means for performing read control of the valid cells stored in said memory means to sequentially read out the valid cells at a predetermined timing, and wherein said second multiplexing means comprises a second plurality of memory means arranged in correspondence with multiplexed cell streams output from said first cell multiplexing means, for temporarily storing the multiplexed cell streams in units of cells, and a second read control means for sequentially designating to read out the cells stored in said second plurality of memory means.

2. An apparatus according to claim 1, wherein said read control means assigns a time corresponding to a plurality of cells to a channel corresponding to each of the input cell streams, thereby generating the multiplexed cell stream.

3. An apparatus according to claim 2, wherein the multiplexed cell stream is constituted by assigning a time corresponding to an odd number of cells not less than three to the channel corresponding to each of the input cell streams, and assigning a valid cell to a central position of the assigned time.

4. An apparatus according to claim 1, wherein said memory means is constituted by a FIFO memory.

5. An ATM cell multiplexing apparatus comprising:

a plurality of first cell multiplexing means for dividing a plurality of input cell streams into a plurality of groups and multiplexing each of said plurality of groups to form a plurality of multiplexed cell streams; and second cell multiplexing means for further multiplexing said multiplexed cell streams and outputting one output multiplexed cell stream;

wherein said second cell multiplexing means comprises a plurality of memory means, arranged in correspondence with the multiplexed cell streams output from said first cell multiplexing means, for temporarily storing the multiplexed cell streams in units of cells, read control means for sequentially designating to read out the cells stored in said memory means, and retrieval means for accessing, while reading out the cells from one of said memory means, remaining memory means of said memory means in a predetermined order to check whether a cell is stored in said memory means.

6. An apparatus according to claim 5, wherein when no cells are stored in said remaining memory means, said retrieval means subsequently accesses said one of said memory means from which the cells are being read out to check whether a cell is stored in said memory means.

7. An apparatus according to claim 5, wherein said retrieval means comprises
- a first counter for frequency-dividing a clock by N (N is an integer of not less than 2),
- a second counter for receiving an output from said first counter as an enable signal and, upon receiving the enable signal, frequency-dividing the clock by M (M is an integer of not less than 2 and not more than N),
- a selector for selecting, in accordance with a parallel output from said second counter, one of cell available signals which represent an active state capable of reading out the cells from said memory means, and
- a logic circuit for shielding the enable signal from said first counter to said second counter when an output from said selector represents an active state, thereby stopping a count operation of said second counter, and the parallel output from said second counter is fixed to a value at which the cell available signal representing an active state is selected by said selector in a count stop state.

8. An apparatus according to claim 7, wherein said read control means comprises
- a latch circuit for latching the fixed parallel output from said second counter at a cell read timing, and
- a decoder for decoding a latch output from said latch circuit and outputting the enable signal to a corresponding one of said memory means.

9. An apparatus according to claim 5, wherein said memory means is constituted by a FIFO memory.

10. An ATM cell multiplexing apparatus comprising:
- a plurality of first cell multiplexing means for dividing a plurality of input cell streams into a plurality of groups, thereby multiplexing the input cell streams in units of groups; and
- second cell multiplexing means for further multiplexing multiplexed cell streams output from said first cell multiplexing means and outputting one multiplexed cell stream,
wherein each of said first cell multiplexing means comprises
- a plurality of memory means, arranged in correspondence with the input cell streams, for temporarily storing valid cells of the input cell streams, and
- read control means for performing read control of the valid cells stored in said memory means to sequentially read out the valid cells at a predetermined timing, and assigning a time corresponding to a plurality of cells to a channel corresponding to each of the input cell streams, thereby generating the multiplexed cell stream, and
said second cell multiplexing means comprises
- a plurality of memory means, arranged in correspondence with the multiplexed cell streams output from said first cell multiplexing means, for temporarily storing the multiplexed cell streams in units of cells,
- read control means for sequentially designating to read out the cells stored in said memory means, and
- retrieval means for accessing, while reading out the cells from one of said memory means, remaining memory means of said memory means in a predetermined order to check whether the cells can be read out from said memory means.

* * * * *